United States Patent
Tucker et al.

(10) Patent No.: US 9,221,330 B2
(45) Date of Patent: Dec. 29, 2015

(54) AIR INTAKE SHROUD

(71) Applicant: Consolidated Metco, Inc., Vancouver, WA (US)

(72) Inventors: David Tucker, Portland, OR (US); Graham Wildey, Vancouver, WA (US); Michael Flynn, Vancouver, WA (US)

(73) Assignee: Consolidated Metco, Inc., Vancouver, WA (US)

( * ) Notice: Subject to any disclaimer, the term of this patent is extended or adjusted under 35 U.S.C. 154(b) by 279 days.

(21) Appl. No.: 13/930,978

(22) Filed: Jun. 28, 2013

(65) Prior Publication Data
US 2015/0000778 A1    Jan. 1, 2015

(51) Int. Cl.
*B60K 11/08* (2006.01)

(52) U.S. Cl.
CPC ..................... *B60K 11/08* (2013.01)

(58) Field of Classification Search
CPC ........ B60K 11/00; B60K 11/02; B60K 11/04; B60K 11/08
USPC ................................. 180/68.1–68.5
See application file for complete search history.

(56) References Cited

U.S. PATENT DOCUMENTS 5,597,047 A * 1/1997 Thompson et al. .......... 180/68.4

* cited by examiner

*Primary Examiner* — John Walters
*Assistant Examiner* — James Triggs
(74) *Attorney, Agent, or Firm* — Edward J. Brosius

(57) ABSTRACT

A motor vehicle recirculation baffle including a seal and a plurality of substrates connected to the seal. The seal having an upper portion and two side portions, the two side portions connected to the upper portion by flexible corners. The flexible corners allow the side portions to move independently of each other and independently of the upper portion of the seal. The seal and flexible corners can be molded in die draw. The flexible corners provide a cost savings in the manufacturing of the recirculation baffle, because after the seal is molded.

15 Claims, 3 Drawing Sheets

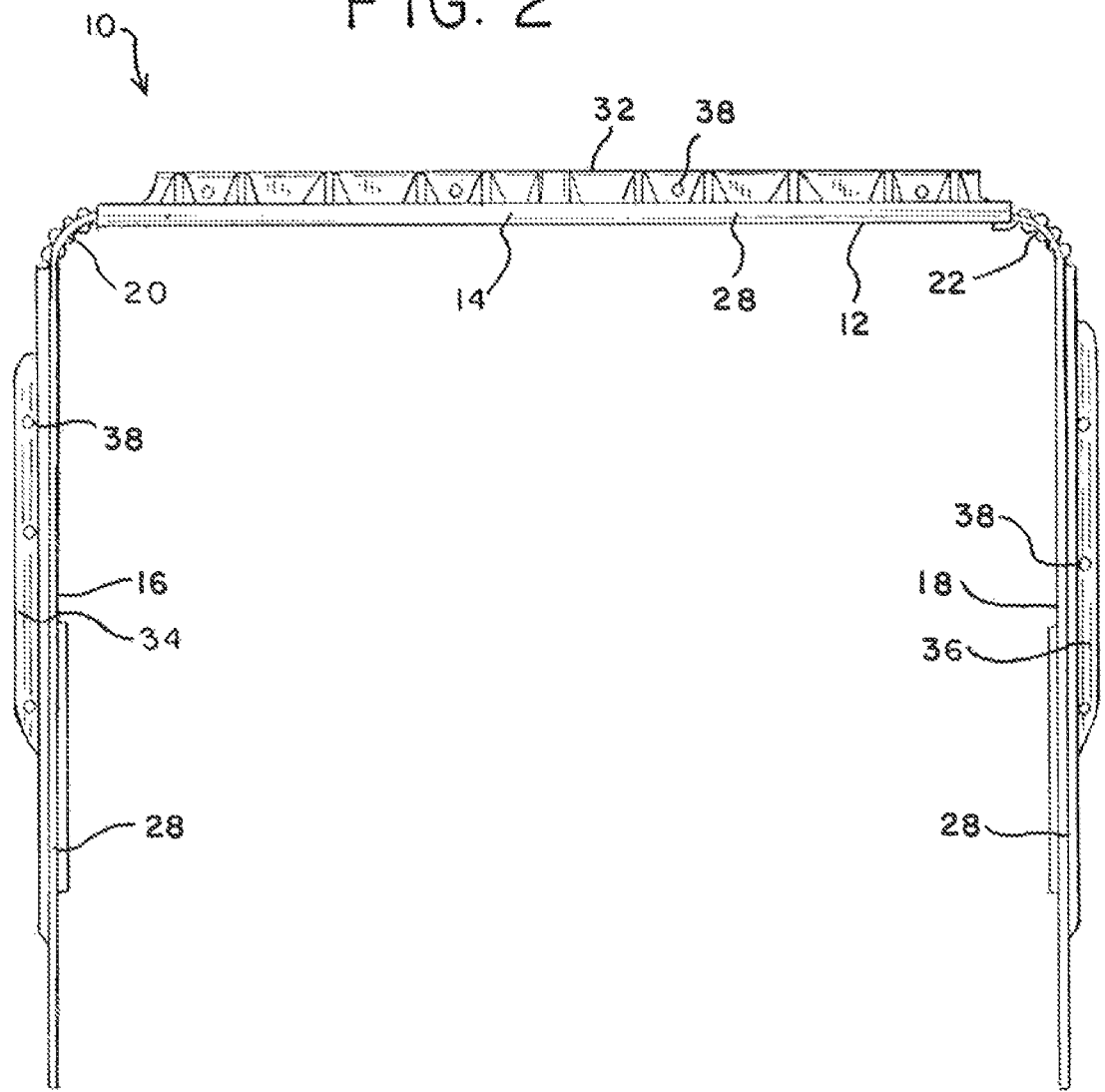

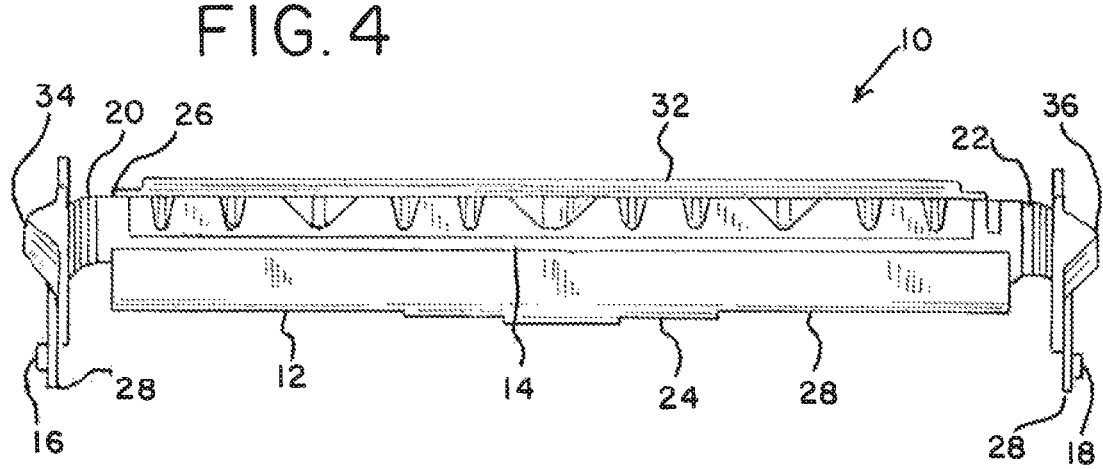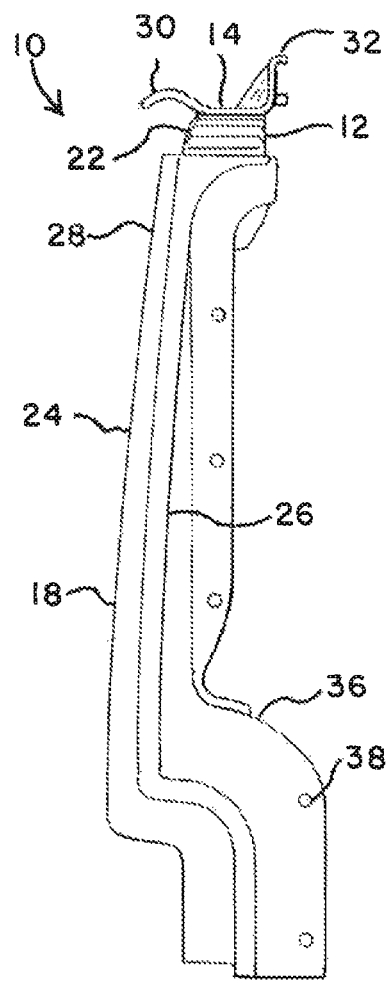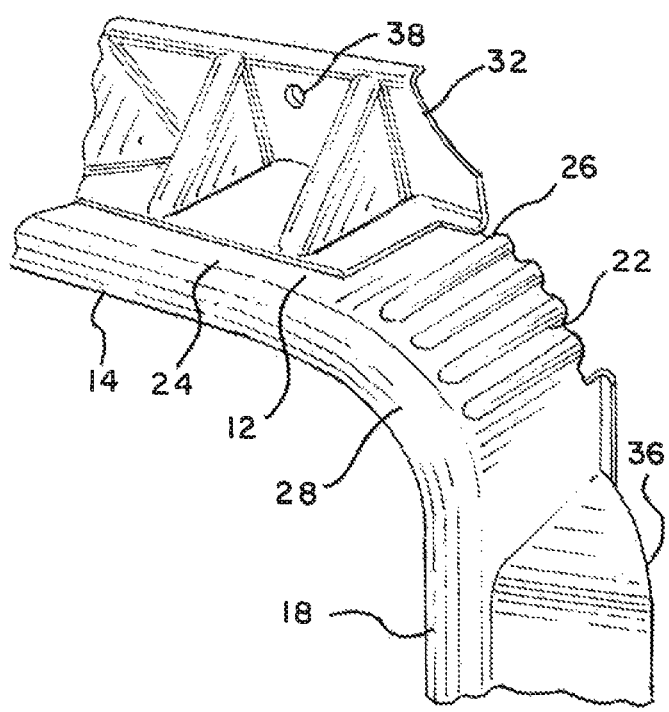

AIR INTAKE SHROUD

BACKGROUND OF THE INVENTION

The invention relates generally to recirculation baffles, and more particularly recirculation baffle with flexible corners to control airflow through the radiator and into the engine compartment of a motorized vehicle.

This invention is applicable to the radiator apparatus of a motorized vehicle. The recirculation baffle apparatus is secured to the radiator of a motorized vehicle, and creates a seal between the radiator and the vehicle hood. The seal created by the recirculation baffle creates a cooling package of air, in the portion of engine compartment that the radiator draws air from to cool the engine, by preventing the hot air discharged by the fan from recirculating from behind the radiator and through the engine a second time. The seal created by the recirculation baffle also channels the air through the radiator and into the engine more efficiently.

In the current recirculation baffle assembly used in the motor vehicle and trucking industry, the recirculation baffle component is a three piece assembly including one upper and two side portions. Each piece of the assembly is formed separately by a traditional injection molding process. After each piece of the assembly is molded, all three pieces must be manually assembled to create the final recirculation baffle component. The additional step of assembling the components of the recirculation baffle after each piece of the assembly is molded is time consuming and costly. After the recirculation baffle is assembled, additional tooling is required to adjust the recirculation baffle to fit each specific radiator it is being installed on.

The present invention provides a recirculation baffle assembly with flexible corners that is molded in die draw and does not additional tooling after the molding process is complete. The flexible corners on the recirculation baffle of the present invention provide cost savings in both manufacturing and packaging of the recirculation baffle, as well as provide dampening from vibrations normally transferred from the upper portion to the side portions of the recirculation baffle.

SUMMARY OF THE INVENTION

In accordance with the present invention, a recirculation baffle with flexible corners is provided for use.

One embodiment of the present recirculation baffle includes a seal and a plurality of substrates. The seal has two flexible corners that allow the seal to bend and move without compromising the structural integrity of the recirculation seal. The substrates are attached to the seal.

Another embodiment of the present recirculation baffle includes a seal and a plurality of substrates. The seal has at least two flexible corners that allow the seal to bend and move without compromising the structural integrity of the seal. The at least two flexible corners separate the seal into an upper portion and at least two side portions. The substrates are attached to the seal, with one substrate being attached to the upper portion of the seal, and additional substrates attached to each of the at least two side portions of the seal.

Another embodiment of the present recirculation baffle includes a seal having an upper portion, a first side portion, and a second side portion, a first flexible corner, a second flexible corner, and a plurality of substrates. The first side portion of the seal is connected to the upper portion of the seal by the first flexible corner, and the second side portion of the seal is connected to the upper portion of the seal by the second flexible corner. The plurality of substrates are attached to the seal on the upper portion, the first side portion, and the second side portion.

It is an object of the present invention to provide a recirculation baffle that creates a seal between a radiator and the inside walls of an engine compartment in a motorized vehicle, preventing hot air discharged by the fan from recirculating from behind the radiator and through the engine a second time.

It is another object of the present invention to provide a recirculation baffle that increases the efficiency of the radiator by channeling cool air through the radiator.

It is another object of the present invention to provide a recirculation baffle that can be manufactured by a molding process that allows the seal to be manufactured with minimal tooling complexity.

It is another object of the present invention to provide a recirculation baffle that decreases assembly time of the baffle.

It is another object of the present invention to provide a recirculation baffle that is molded in die draw.

It is another object of the present invention to provide a recirculation baffle with flexible corners where the flexible corners are an over-molded flexible material.

It is a further object of the present invention to provide a recirculation baffle with flexible corners that allows tolerance relief when installing the baffle on different radiators.

It is a further object of the present invention to provide a recirculation baffle with flexible corners where the flexible corners have the ability to move and adjust to any angle with respect to the upper portion of the recirculation baffle.

It is a further object of the present invention to provide a recirculation baffle with flexible corners that dampens vibrations that are transferred from the upper portion to the side portions of the recirculation baffle.

It is a further object of the present invention to provide a recirculation baffle with flexible corners that produces logistical and packaging savings due to increased pack density when packaging the recirculation baffle.

It is still a further object of the present invention to provide a recirculation baffle with flexible corners that can also serve as a flexible radiator shroud.

DESCRIPTION OF THE DRAWINGS

FIG. 2 is a front elevational view of the recirculation baffle of the present invention;

FIG. 3 is a side elevational view of the recirculation baffle of the present invention;

FIG. 4 is a top plan view of the recirculation baffle of the present invention; and FIG. 5 is an isometric view of the flexible corner of the recirculation baffle of the present invention.

DETAILED DESCRIPTION

Figure 1:
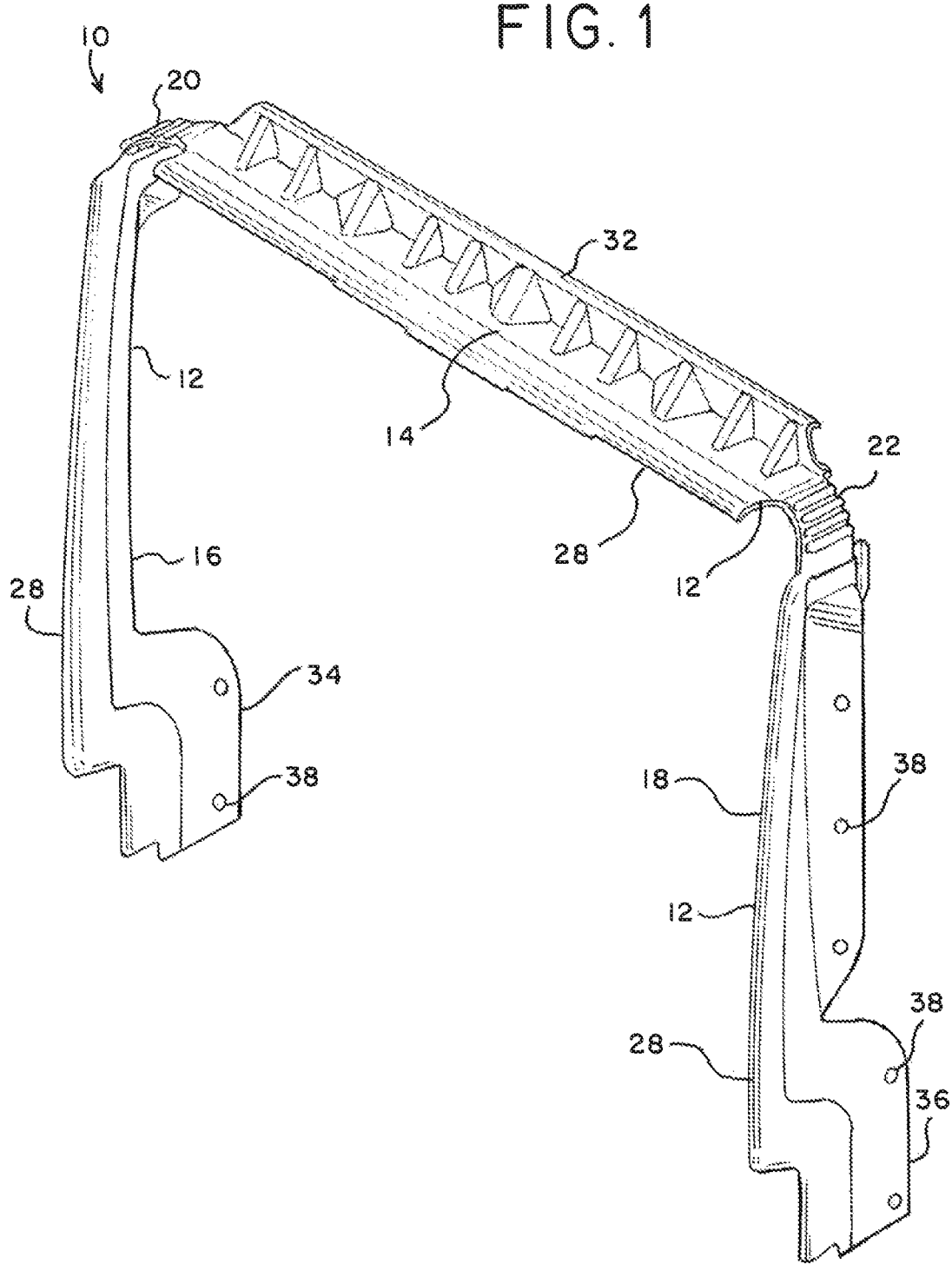
FIG. 1 is an isometric view of the recirculation baffle of the present invention.

Referring now to FIGS. 1-5, a motor vehicle recirculation baffle with flexible corners is generally designated 10 and comprises a seal 12, flexible corners 20, 22, and substrates 32, 34, 36. The seal 12 includes an upper portion 14 and two side portions 16, 18 that generally form the seal 12 into a U-shape to fit around the radiator of a motor vehicle. The side portions 16, 18 of the seal 12 are connected to the upper portion 14 of seal 12 by two over-molded, flexible corners 20, 22. The flexible corners 20, 22 enable the side portions 16, 18 of the seal 12 to move independently of each other and the upper portion 14 of the seal 12.

The flexible corners 20, 22 allow the side portions 16, 18 of the recirculation baffle 10 to adjust to fit any motor vehicle radiator using an engine hood that pulls forward, with minimal tooling required to attach the recirculation baffle 10 on the radiator. The flexible corners 20, 22 dampen vibrations that are transferred from the upper portion 14 to the side portions 16, 18 of the seal 12 during use. It is further contemplated that the recirculation baffle of the present invention can be placed on the alternate side of a motor vehicle engine and serve as a flexible radiator shroud.

The seal 12 contains a first edge 24 and a second edge 26, with the first edge 24 having a bulb 28 that is thicker than the second edge 26. The increased thickness of the bulb 28 creates a seal between the radiator and the inside walls of the engine compartment of the motor vehicle. The seal creates a cooling package on the front side of the radiator by preventing hot discharge air from the rear side of the radiator from being recirculated back to the front side of the radiator. The bulb 28 and seal 12 also channel the air or cooling package through the radiator and into the engine more efficiently, by sealing off the empty space between the radiator and the interior walls of the engine compartment, allowing the air in front of the radiator only one place to flow.

The seal 12 contains a securing hook 30 and substrates 32, 34, 36. The securing hook 30 is attached to the upper portion 14 of seal 12, and molded in die draw as part of the seal 12. The securing hook 30 deforms as the motor vehicle hood is pulled over the radiator, creating a tight seal between the radiator and the interior walls grill-hood area. The deformation of the securing hook 30 also helps secure the seal in place during use. The substrates 32, 34, 36 are attached to the upper portion 14 and the side portions 16, 18 of the seal 12. The substrates 32, 34, 36 contain multiple holes 38 to secure the recirculation baffle 10 to the radiator in a motor vehicle. The holes 38 in the substrates 32, 34, 36 enable a screw, bolt and nut, rivet, or the like to be used to secure the recirculation baffle 10 to the radiator.

The upper portion 14 and side portions 16, 18 of the seal 12, and the substrates 32, 34, 36 are molded using a traditional injection or compression molding process. The upper portion 14 and side portions 16, 18 of the seal 12, and substrates 32, 34, 36 are a stiff or high modulus, molded material such as a thermal plastic polymeric material. After the stiff, thermal plastic polymeric components are molded, the components are placed into a secondary cavity where the components are assembled utilizing an over-molded secondary material to create the flexible corners 20, 22, connecting the side portions 16, 18 to the upper portion 14 and creating a one-piece seal 12. The over-molded material used to create the flexible corners 20, 22 is an elastomeric or low modulus material, such as Urethane, Polyvinyl Chloride (PVC), Polyolefin, a Silicone based resin, or the like, which allows the flexible corners 20, 22 to move and bend without compromising the structural integrity of the flexible corners 20, 22. After the over-molding process is complete, the recirculation baffle 10 is ready for use and no further assembly or tooling is necessary prior to installation. It is also contemplated that the stiff components of the present invention be molded from a flexible resin, thereby eliminating the two-step molding process.

Assembling the recirculation baffle utilizing the over-molding process to create the flexible corners provides a cost savings in the manufacturing process compared to the traditional manual assembly method required after the molding process of the recirculation baffle is complete. The flexible corners design allows a large seal to be molded in die draw, which was not previously possible. The flexible corners created by the over-molding process allow the side portions of the recirculation baffle to be folded together along side of the upper portion, increasing the packing density of the product and providing a cost savings in the packaging of the recirculation baffle.

While particular embodiments of the present invention have been illustrated and described herein, it will be appreciated by those skilled in the art that changes and modifications may be made thereto without departing from the invention in its broader aspects.

What is claimed is:

1. A motor vehicle recirculation baffle comprising:
a seal;
a plurality of substrates;
wherein said seal has at least two flexible corners, and said plurality of substrates are attached to said seal, wherein said seal has an upper portion and two side portions, said side portions of said seal connected to said upper portion of said seal by said at least two flexible corners.

2. The motor vehicle recirculation baffle of claim 1, wherein said seal has a first edge and a second edge, said first edge having a bulb that is thicker than said second edge of said seal.

3. The motor vehicle recirculation baffle of claim 1, said at least two flexible corners being an over-molded, elastomeric material.

4. The motor vehicle recirculation baffle of claim 1, wherein said at least two flexible corners allow said side portions to fold and move independently of said upper portion and independently of each other.

5. The motor vehicle recirculation baffle of claim 1, wherein said seal having said at least two flexible corners is molded in die draw.

6. The motor vehicle recirculation baffle of claim 1, wherein said seal contains a deformable securing hook.

7. A motor vehicle recirculation baffle comprising:
a seal;
a plurality of substrates;
wherein said seal has an upper portion and at least two side portions, said upper portion connected to said at least two side portions by at least two flexible corners;
wherein said plurality of substrates are attached to said seal.

8. The motor vehicle recirculation baffle of claim 7, wherein said seal has a first edge and a second edge, said first edge having a bulb that is thicker than said second edge of said seal.

9. The motor vehicle recirculation baffle of claim 7, said at least two flexible corners being an over-molded, elastomeric material.

10. The motor vehicle recirculation baffle of claim 7, wherein said seal having said at least two flexible corners is molded in die draw.

11. A motor vehicle recirculation baffle comprising:
a seal having an upper portion, a first side portion, and a second side portion;
a first flexible corner;
a second flexible corner;
a plurality of substrates;
wherein said first side portion of said seal is connected to said upper portion of said seal by said first flexible corner, and said second side portion of said seal is connected to said upper portion of said seal by said second flexible corner;

wherein said plurality of substrates are attached to said seal on said upper portion, said first side portion, and said second side portion.

12. The motor vehicle recirculation baffle of claim 11, wherein said seal has a first edge and a second edge, said first edge having a bulb that is thicker than said second edge of said seal.

13. The motor vehicle recirculation baffle of claim 11, said first flexible corner and said second flexible corner being an over-molded, elastomeric material.

14. The motor vehicle recirculation baffle of claim 11, wherein said first flexible corner and said second flexible corner allow said first side portion and said second side portion to fold and move independently of said upper portion and independently of each other.

15. The motor vehicle recirculation baffle of claim 11, wherein said seal having said first flexible corner and said second flexible corner is molded in die draw.

\* \* \* \* \*